Feb. 23, 1926.
C. H. HAPGOOD
SCALE
Filed April 5, 1920     2 Sheets-Sheet 1
1,574,089
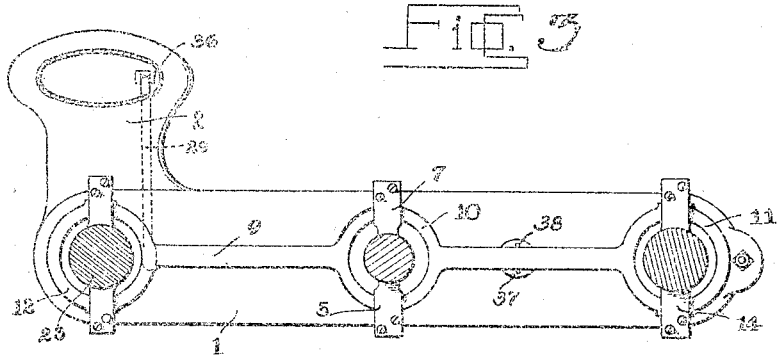
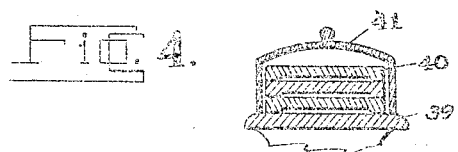
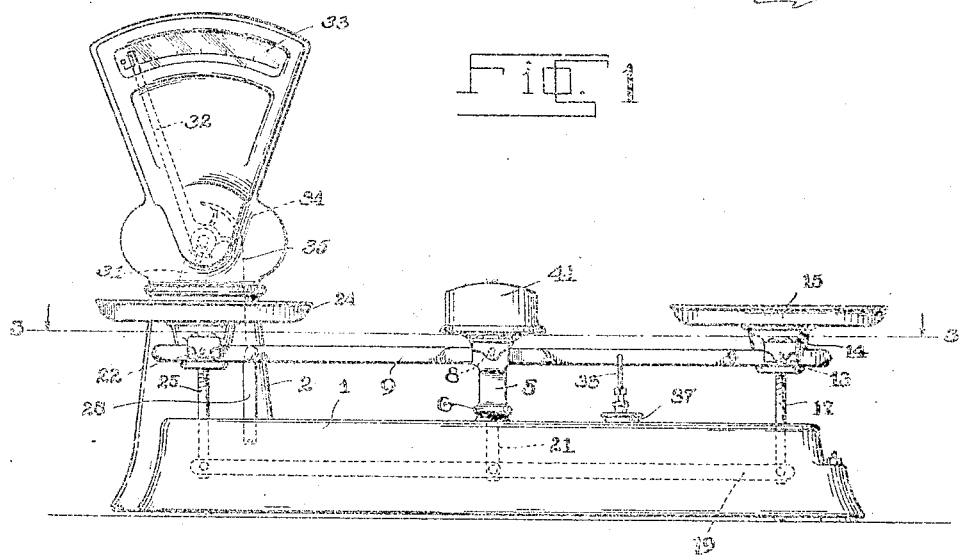
Inventor
Clarence H. Hapgood
By George R. Frye
Attorney

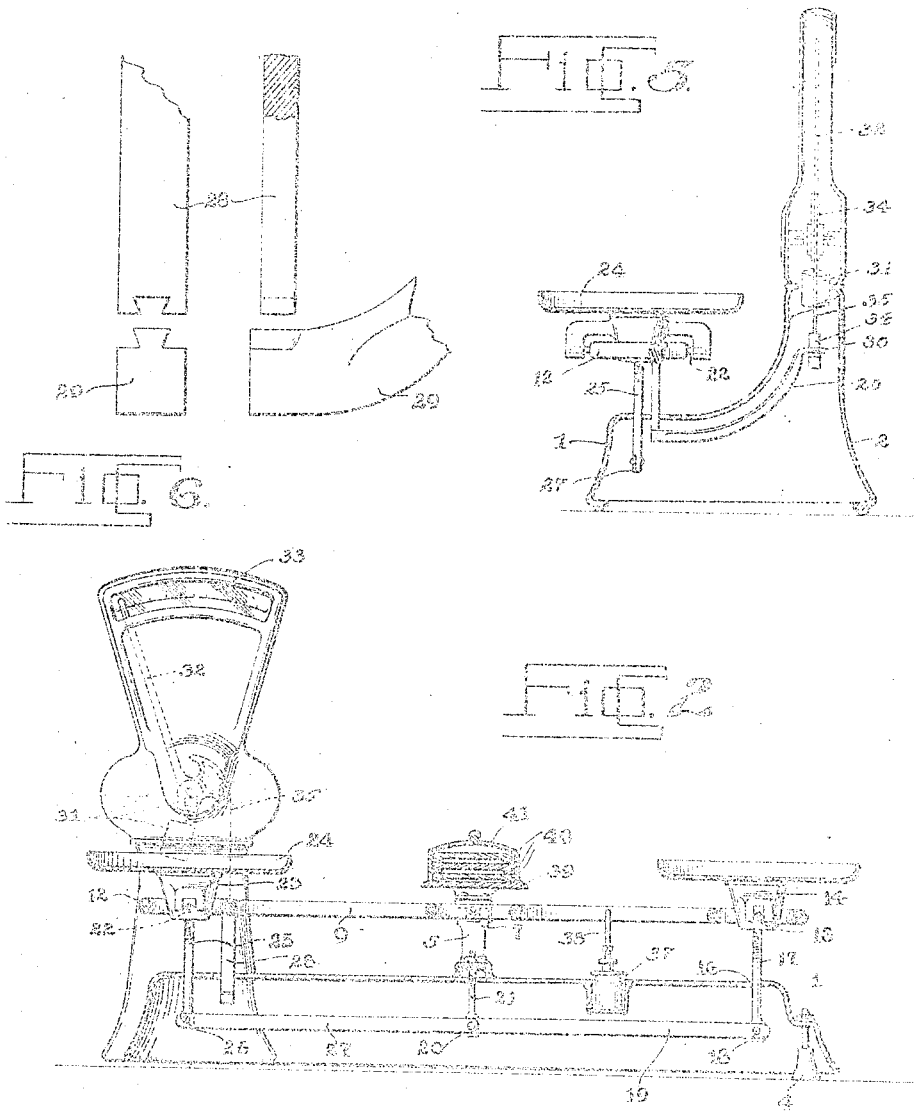

Patented Feb. 23, 1926.

1,574,089

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

SCALE.

Application filed April 5, 1920. Serial No. 371,403.

*To all whom it may concern:*

Be it known that I, CLARENCE H. HAPGOOD, a citizen of the United States, residing at Toledo, in the county of Lucas and State of Ohio, have invented certain new and useful Improvements in Scales, of which the following is a specification.

This invention relates to scales, and more particularly to scales of the counter type such as are generally used in drug stores.

Among its principal objects are to provide a scale of this kind which is very sensitive and has a comparatively great capacity, and to so arrange the mechanism of the scale that the commodity-receiver is directly in front of a chart having an indicator hand co-operating therewith to indicate the weight upon the commodity-receiver.

Other objects and advantages will be apparent from the following description, in which reference is had to the accompanying drawings illustrating a preferred embodiment of my invention and in which similar reference numerals designate similar parts throughout the several views.

In the drawings:—

Figure 1 is a front elevation of a scale embodying my invention;

Figure 2 is a vertical section through the scale lever, with the scale housing broken away to show the interior mechanism;

Figure 3 is a sectional plan view taken substantially on the line 3—3 of Figure 1, the base housing of the scale being shown as having a part broken away;

Figure 4 is an enlarged vertical section taken through the center of the counterpoise housing;

Figure 5 is a side elevation, partly in section, taken on a vertical plane cutting the lower part of the housing; and Figure 6 is a detail view of the connection between the main lever and pendulum operating mechanism.

Referring to the drawings in detail, the base housing 1 of the scale is provided with a portion 2 which extends rearwardly at the left end of the main part of the housing, and supported upon the rearwardly-extending portion 2 is a substantially fan-shaped upright casing which contains the automatic load-offsetting and indicating mechanism of the scale. For the purpose of leveling the scale the base housing is provided at one end with an adjustable foot 4 by means of which the end of the scale may be raised or lowered, a pair of rounded feet adjacent the opposite end of the scale acting as fulcrums about which the scale swings. Secured at substantially the center of the upper face of the base housing 1 is a U-shaped lever support 5, its bight portion 6 extending transversely of the housing and its leg portions projecting upwardly to form fulcrum stands 7. The upper ends of the stands 7 carry grooved bearings in which the knife edge fulcrum pivots 8 of the main lever 9 are received.

For the purpose of obtaining lateral stability the main lever 9 of the scale is expanded at its center into a substantially annular portion 10, and the ends of the lever 9 are likewise expanded to form annular portions 11 and 12 (see Figure 3). Upwardly-turned knife edge pivots 13 project from opposite sides of the annular portion 11 of the lever to support the spider 14 carrying the counterpoise pan 15. Depending from the spider 14 and passing through an opening 16 in the upper wall of the base housing 1 is a spider stem 17, the lower end of which is pivoted at 18 to one end of a check link 19. The check link 19 is substantially equal in length to the arm of the lever which supports the pan 15, and is pivoted at 20 to the lower end of a vertically-adjustable shift post 21 in line with the fulcrum pivots of the lever 9.

Projecting from opposite sides of the annulus 12 of the lever 9 are upwardly-turned knife edge pivots 22, which support a spider 23 carrying the commodity-receiving pan 24. The spider 23 is also provided with a downwardly-extending stem 25, the stem 25 being pivoted at 26 to one end of a check link 27. The check link 27 is substantially equal in length to the arm of the main lever which carries the commodity-receiving pan 24 and is also pivoted to the lower end of the shift post 21. The links 19 and 27 are pivoted to the post 21 upon the same axis, which is parallel to and lies directly beneath the axis of the fulcrum pivots 8. When the main lever 9 is in horizontal position, lines joining the pivots on the lever and the check link pivots form a rectangle, and as the lever rocks during weighing operations the pivots 18 and 26 remain directly beneath the pivots 13 and 22 respectively. The poise-receiving pan and the commodity-receiving pan are thereby kept from tilting when the lever rocks on its pivots.

Rigidly secured to the lever 9 and projecting downwardly from the commodity-supporting end thereof is an arm 28, to which is secured a laterally and upwardly extending pendulum-actuating member 29 (see Figure 5). Upon the free end of this curved member 29 is formed a nose 30, herein shown with a cone pivot which is arranged in the same horizontal plane with the pivots 8 of the main lever.

Pivotally mounted within the casing 3 is a pendulum 31 having an indicator hand 32 rigidly connected thereto and arranged to be moved over the chart 33 by swinging movement of the pendulum. The pendulum 31 is provided with a power sector 34, as shown in Figure 2, and connected to the power sector 34 and extending downwardly over the curved face thereof is a flexible steel band or ribbon 35. The lower end of the ribbon 35 carries a stirrup 36 which engages the pivot carried by the nose 30 of the curved member 29.

A dash pot 37 is preferably mounted in the base housing 1 and contains a plunger adapted to reciprocate in oil, the plunger being connected to the lever 9 by means of the link 38.

Mounted upon the upper ends of the fulcrum stands 7 supported above the pivots 8 a sufficient distance to clear the lever 9 as it swings during weighing operations is a small circular table 39 which is employed to support loose counterweights 40, and a suitable cover 41 is provided to enclose the counterweights and keep them free from dust and corrosion.

In the operation of the scale when a load is placed upon the commodity-receiving pan 24 the corresponding end of the lever 9 will be forced downwardly, and since the arm 28 and curved member 29 are rigidly connected to the lever 9 they will move downwardly with it, pulling down upon the ribbon 35 and thereby swinging the pendulum 31 until it reaches a position in which the load on the commodity-receiving pan is counterbalanced. The indicator hand 32, being rigid with the pendulum, will move over the chart and indicate the amount of displacement of the pendulum. The chart 33 is graduated in the well-known manner so that the weight of the load on the commodity-receiver may be read directly in pounds and ounces, and, if desired, value computations can be marked thereon at various prices per pound. Should the load on the commodity-receiving pan be so great as to swing the indicator entirely across the chart, one or more of the loose counterweights 40 may be placed upon the weight pan 15. Then, the weights 40 on the pan 15 acting in conjunction with the pendulum 31 will cause the commodity end of the lever 9 to rise and the indicator hand 32 will move to a position on the chart indicating the portion of the load offset by the pendulum 31. The total weight of the load may be found by adding the weight of the loose counterweights on the pan 15 to the weight indicated on the chart 33. Movement of the dash pot plunger is retarded by the oil or other fluid in the dash pot, and since the plunger is connected to the lever 9 by means of the link 38, the oil will serve to dampen vibration of the weighing mechanism of the scale.

It will be observed by inspection of Figure 1 that the commodity-receiving pan is located directly in front of the chart 33. In most of the weighing operations in which the scale is likely to be used the loose weights will not be employed. The operation in such case will consist merely in placing the commodity upon the pan and reading the weight on the chart.

In case it is desired to use the device as a predetermined weight scale, the parts forming the weighing mechanism are so proportioned and arranged that the indicator 32 stands in a vertical position when the commodity-receiving pan and counterweight-receiving pan are empty. A poise of the desired weight is then placed upon the counterweight-receiving pan 15 and the article the weight of which is to be tested is placed upon the commodity-receiving pan 24. Should the article be over-weight the indicator hand will move to the right, and should it be underweight the indicator hand will move to the left, the amount of over or under-weight being shown on the chart.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a scale, in combination, a frame, a single laterally extending lever fulcrumed thereon, a commodity-receiver and a poise-receiver on said lever on opposite sides of its fulcrum, automatic load-counterbalancing mechanism connected to said lever, a chart at the rear of and facing said commodity-receiver, and an indicator connected to said load-counterbalancing mechanism and movable over said chart.

2. In a scale, in combination, a base having a rearwardly-extending portion at one end thereof, a chart supported upon said rearwardly-extending portion, a lever fulcrumed on said base and carrying a commodity-receiver at one of its ends and a poise-receiver at its other end, said commodity-receiver being located in front of said chart, automatic load-offsetting mechanism connected to said lever, and an indicator connected to said load-offsetting mechanism and movable over said chart.

3. In a scale, in combination, a laterally extending equal arm lever, a commodity receiver, and a pendulum load-offsetting device located adjacent and at the rear of one end of said lever and directly connected thereto.

4. In a scale, in combination, a laterally extending equal arm lever, a rigid rearwardly projecting member adjacent one end thereof, pendulum weighing mechanism, and means connecting said pendulum weighing mechanism to said projecting member.

5. In a scale, in combination, an equal arm lever, pans at each end thereof, a member rigid with said lever and projecting laterally therefrom adjacent one of its ends, pendulum load-offsetting mechanism connected to said laterally projecting member, a chart facing one of said pans, and an indicator connected to said load-offsetting mechanism and movable over said chart.

6. In a scale, in combination, a lever fulcrumed intermediate its ends on pivots, a poise-receiver carried by one arm of the lever, a commodity-receiver carried by the other arm of the lever, a member rigidly secured at one end to the lever and projecting angularly therefrom, the other end of said member being provided with a pivot arranged in the same horizontal plane as the fulcrum pivots of said lever, and load-offsetting mechanism actuated from the pivot in said member.

7. In a scale, in combination, a three-arm lever having pivots in each arm arranged in the same horizontal plane, a poise-receiver supported upon the pivot of one of its arms, a commodity-receiver supported upon the pivot of another of its arms, and load-offsetting mechanism connected to and actuated from the pivot of third arm.

CLARENCE H. HAPGOOD.